April 27, 1948.    H. F. FISHER ET AL    2,440,504
APPARATUS FOR ELECTROPHORETIC SEPARATION OF SOLIDS FROM LIQUIDS
Filed Aug. 16, 1944
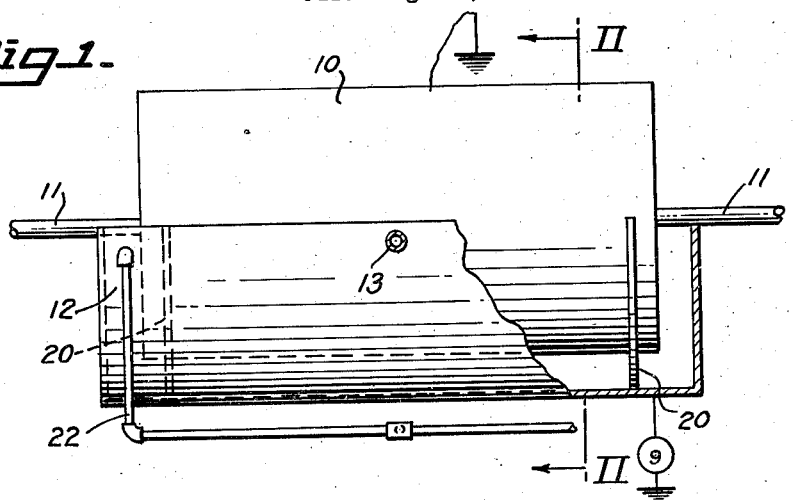
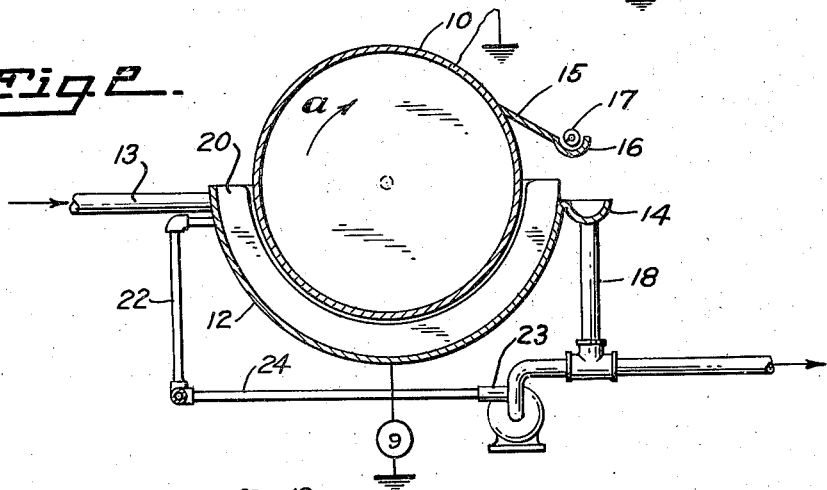
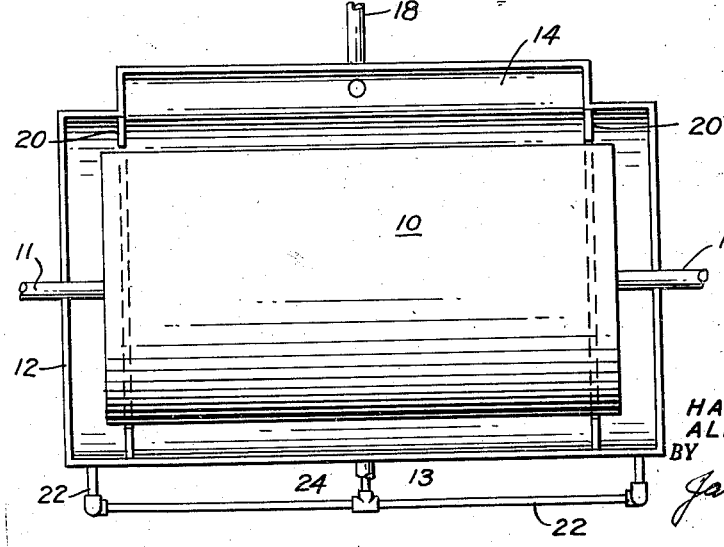
INVENTORS
HARMON F. FISHER
ALBERT C. PECK
BY Patented Apr. 27, 1948

2,440,504

UNITED STATES PATENT OFFICE 2,440,504

APPARATUS FOR ELECTROPHORETIC SEPARATION OF SOLIDS FROM LIQUIDS

Harmon F. Fisher, Palo Alto, and Albert C. Peck, Los Altos, Calif., assignors, by mesne assignments, to The Permanente Metals Corporation, a corporation of Delaware Application August 16, 1944, Serial No. 549,776

1 Claim. (Cl. 204—300)

This invention relates to the separation of finely divided solids from liquids by electrophoresis and particularly to apparatus for effecting such separation wherein a rotating cylindrical drum is partially immersed in a bath of the liquid from which the solids are to be separated.

One application to which the invention is adapted is the separation of magnesium dust from liquid hydrocarbons and the invention will be disclosed in its relation to that particular application for purposes of illustration. The description is however not to be taken as limiting the invention to the example given as its usefulness is not confined to any particular solids nor to any particular liquid medium from which the solids are being separated.

In the carbothermic process of manufacturing magnesium the furnace product is a mixture of extremely finely divided magnesium particles with some carbon and some magnesium oxide. This mixture, usually referred to as "magnesium dust," is later pelleted and subjected in pellet form to a distillation or sublimation process by which the pure magnesium is recovered in a solid crystalline deposit. Magnesium dust is readily oxidizable and consequently is highly pyrophoric. As a result it has become common practice to protect the dust by wetting it with an abundance of liquid hydrocarbon. This may be accomplished by using a liquid hydrocarbon chilling medium for the vapor evolved in the course of thermic reduction or immediately after chilling with a gaseous or solid medium. The liquid hydrocarbon and the dust form a slurry which may be safely and conveniently handled through the steps leading up to sublimation.

The separation of the solids from the slurry becomes necessary but due to their extremely finely divided state conventional methods of separation such as settling, centrifuging and filtration have proven inadequate.

Good results are obtained by electrophoretic separation in an apparatus comprising a horizontal rotatable drum, the lower portion of which is immersed in slurry flowing through a pan below the drum. The pan and drum are electrically charged to opposite signs to create a potential which causes the solids to be deposited on the drum. The solids are scraped from the continuously rotating drum at a point above the level of the liquid in the pan.

As the pan is semicylindrical to conform to the shape of the drum there are spaces between the ends of the drum and the ends of the pan where electrophoretic action does not take place with the same uniformity and consistency as on the cylindrical surface of the drum. Consequently some of the slurry passes to the discharge end of the pan to foul the discharging hydrocarbon phase which should be clear, and a deposit of solids accumulates on the ends of the drum where it is not practical to effect its continuous removal by scrapers. Furthermore, the relatively heavy deposit of solids on the corners of the drum resulting from the varying degree of electrophoresis is also objectionable because the deposit will become sufficiently large before operations have continued for any extensive period of time to cause short circuiting between the drum and the pan.

It is the object of the present invention to overcome the disadvantages herein referred to and to provide an apparatus for electrophoretic deposition of solids on the cylindrical surface of a drum partially immersed in liquid without causing such deposition on the ends of the drum. A further object of the invention is to provide means to prevent fouling of the discharge phase in an apparatus of the kind described.

A preferred form of the invention is illustrated in the accompanying drawings to which reference is made in the following specification.

In the drawings:

Fig. 1 is a front elevation of an apparatus embodying the present invention with parts thereof shown in section Fig. 2 is a vertical transverse sectional view taken on the line II—II of Fig. 1, and Fig. 3 is a plan view of the apparatus with the scraper removed.

The drawings show a horizontally disposed drum 10 of an electrically conductive material mounted for rotation on shafts 11, rotation being effected by a source of power not shown. A semi-cylindrical pan 12 connected to a generator 9 or other source of high electrical potential is disposed beneath the drum and is adapted to contain a fluid in which substantially the entire lower half of the drum will be immersed. The drum is connected to the other side of the generator 9 as by grounding, as is shown in the drawing. This fluid which may be the slurry from which solids are to be separated, and which, in the case of magnesium production consists of a suspension of magnesium dust and liquid hydrocarbon, is fed constantly into the pan 12 through an inlet pipe 13 at the front side thereof. The fluid entering through the pipe 13 passes downwardly under the drum and overflows the back edge of the pan into a launder 14 which as shown in Fig. 3 preferably extends substantially the entire length of the drum. During the passage of the fluid beneath the drum and while it is confined to the relatively narrow space between the drum and the pan the finely divided solids contained thereby are electrophoretically deposited on the surface of the drum due to the fact that the drum and pan are oppositely electrically charged. The direction of the rotation of the drum is that indicated by the arrow a in Fig. 2 so the solids which have collected thereon during its passage into the liquid bath contained in the pan 12 are removed from the drum by any suitable means such as the scraper indicated at 15 which contacts the drum at a point above the liquid level in the pan, and which may discharge the removed solids into a trough 16 from which they are removed by a rotating screw conveyor 17. The rotation of the drum as well as the flow of fluid through the pan 12 is continuous so a clean surface of the drum as it leaves the scraper 16 is being continuously presented to the bath of slurry in the pan. The clear liquid hydrocarbon resulting from this operation and overflowing into the launder 14 is carried away through a discharge pipe 18.

The principal course followed by the slurry during the removal of the solids therefrom by the apparatus described is beneath the drum 10 where it is confined to the relatively narrow space between the drum and the pan 12. The apparatus may be readily regulated by regulating the speed of the drum, the rate of the flow of the slurry and the magnitude of the electric potential which effects the separation of solids therefrom to effect continuous efficient operation producing substantially 100% separation of solids and a clear hydrocarbon discharge for all of the slurry which passes beneath the drum. There is by necessity, however, a space existing at each end of the drum, between the drum and the ends of the pan where the slurry is not confined to the same uniform semi-cylindrical area during its flow from the feed side to the discharge side of the pan. As the result of this space wherein the electrophoretic separation is not the same as on the cylindrical surface on the drum, some slurry is likely to pass the drum without having been thoroughly clarified and thus be deposited in the launder 14 still containing some of the suspended solids and fouling the clear hydrocarbon which should result from the process. The present invention provides means to prevent slurry from passing the ends of the drum and means to insure the delivery of a clear hydrocarbon phase into the launder 14. To accomplish this, a pair of baffles 20 are provided one adjacent each end of the drum. These baffles are formed of material which is highly dielectric such for example as glass, so as not to cause a short circuit nor otherwise interfere with the potential relied upon to create electrophoretic separation of the solids. The baffles 20 conform to the shape of and are secured to the inner surface of the pan 12 and are spaced very slightly from the cylindrical surface of the drum 10, so as to permit the drum to rotate without hindrance but to prevent free exchange of liquid between the ends of the pan and the central portion of the pan which are separated by the baffles. The pan is divided by these baffles into three zones, one of which includes substantially the entire length of the cylindrical surface of the drum 10, and the other two of which zones include the edges of the cylindrical surface and the ends of the drum. These two end zones are to contain clear liquid rather than the slurry which is being fed through the apparatus and the liquid contained by the end zones is preferably the same as the liquid phase of the suspension from which the solids are being separated. One means of insuring a constant supply of clear liquid to the end zones is shown in the drawings as a pair of supply pipes 22, which enter the pan in substantially the same manner as the main slurry supply pipe 13, one for each of the end zones. A pump 23 withdraws clear liquid from the discharge pipe 18 and delivers it through a pipe 24 to the supply pipes 22. In this manner a continuous flow of clear liquid is caused to pass the ends of the drums thus to prevent any deposit of solids on or adjacent to the drum ends and also to prevent any slurry containing solids in suspension from passing the ends to the launder 14 with the clear phase.

As shown in Figs. 2 and 3 the launder is somewhat lower than the top edge of the pan and is coextensive in length with the central zone between the baffles 20. The only outlet for the clear liquid delivered to the end zones is therefore into the central zone through the spaces between the baffles and the drum. The liquid passing through these spaces establishes a flow from the end zones toward the central zone which acts to prevent slurry from passing in the opposite direction to contaminate the end zones. The quantity of liquid supplied to the end zones through pipes 22 should be sufficient to create a slight flow between the baffles and the drum as described. It may be desirable to deliver liquid to the end zones at a rate which will maintain a slight head or difference in level over the liquid in the central zone to induce the desired flow.

It is possible to maintain an area of clear liquid adjacent the ends of the drums without the use of baffles as herein disclosed by simply recirculating a portion of the clear phase through the ends of the pan in the manner shown. The use of the baffles to prevent any possible mixture of slurry with the clear liquid in the end zones is however considered better practice.

While reference has been made herein to a specific structure for the purpose of illustrating the invention the particular structure disclosed is to be taken as typical only, as variations from the structure shown may be made within the scope of the invention as it is defined in the appended claim.

We claim:

In an apparatus for separating solids from their suspension in a liquid slurry which comprises a horizontal drum of electrical conducting material partially submerged in said slurry, a semi-cylindrical pan electrode for containing the slurry in which said drum is submerged, means for connecting a source of potential across said pan electrode and said drum to effect the electrophoretic deposition of solids onto said drum from said slurry, dielectric baffle means secured to said pan electrode and projecting radially inwardly close to the surface of the drum, said drum extending axially beyond the baffles, said baffles thereby defining outer zones adjacent to the end portions of said drum and an inner annular zone therebetween, said baffle means being adapted to substantially separate said outer zones from said inner zone without frictional engagement with the surface of the drum, delivery means for supplying slurry to one side of the drum to effect the flow of slurry through said inner zone and in a circumferential direction around the under side of the medial portion of said drum, overflow means on the opposite side of the drum to collect the clear liquid formed by passing slurry through said inner zone in such a manner as to electrophoretically deposit said solids onto the medial portion of said drum, and a conduit leading from said overflow means to said outer zones on the same side of the drum and at substantially the same height as the delivery means for recirculating a portion of said clear liquid through each of said outer zones in the same direction as said slurry and for projecting an annular stream of clear liquid inwardly therefrom and into said inner zone.

HARMON F. FISHER.
ALBERT C. PECK.

REFERENCES CITED

The following references are of record in the file of this patent:

UNITED STATES PATENTS

| Number | Name | Date |
|---|---|---|
| 1,073,273 | Miller | Sept. 16, 1913 |
| 2,031,210 | Dillon et al. | Feb. 18, 1936 |
| 2,042,775 | Fisher | June 2, 1936 |
| 2,341,045 | Kiersted | Feb. 8, 1944 |
| 2,376,535 | Fisher | May 22, 1945 |

FOREIGN PATENTS

| Number | Country | Date |
|---|---|---|
| 520,481 | Great Britain | 1940 |